US005796474A

United States Patent [19]
Squire et al.

[11] Patent Number: 5,796,474
[45] Date of Patent: Aug. 18, 1998

[54] PROJECTILE TRACKING SYSTEM

[75] Inventors: Mark Squire; Howard Hyman, both of San Diego; Richard Trissel, Cardiff; George Houghton, San Diego; Daniel Leslie; Murray Dunn, both of Encinitas, all of Calif.

[73] Assignee: ThermoTrex Corporation, San Diego, Calif.

[21] Appl. No.: 667,401

[22] Filed: Jun. 21, 1996

[51] Int. Cl.$^6$ .................. G01B 11/26; G01J 5/02
[52] U.S. Cl. .................. 356/152.1; 356/139.04; 250/342; 250/203.6
[58] Field of Search .................. 356/152.1, 139.04, 356/139.05, 5.01; 250/339.14, 342, 347, 348, 203.6, 206.2

[56] References Cited

U.S. PATENT DOCUMENTS

| | | | |
|---|---|---|---|
| 4,123,134 | 10/1978 | Meyers | 350/6.7 |
| 4,737,028 | 4/1988 | Smith | 356/152 |
| 4,883,348 | 11/1989 | Spivey et al. | 350/503 |
| 5,528,354 | 6/1996 | Uwira | 356/5.01 |

OTHER PUBLICATIONS

Scientific American, Dec. 1995 p. 97.

*Primary Examiner*—Mark Hellner
*Attorney, Agent, or Firm*—Fish & Richardson P.C.

[57] ABSTRACT

The present invention provides a projectile tracking system for acquiring and precisely tracking a projectile in flight in order to reveal the source from which the projectile was fired. The source is revealed by the back projection of a 3-dimensional track file. The system is particularly suited for tracking a bullet fired by a sniper and identifying the location of the sniper. Projectiles of interest are typically traveling at a substantial fraction of the speed of sound or even faster than the speed of sound and therefore become hot due to aerodynamic heating. A telescope focuses infrared light from a relatively large field of view on to an infrared focal plane array. In a projectile detection mode, the system searches for the infrared signature of the fast moving projectile. The telescope's field of view is steered in the azimuth by a step and stare mirror which is driven by an azimuth drive motor mounted on the frame. When a projectile is detected the system switches to a tracking mode and the mirror is steered by the azimuth drive motor and a pivot motor to track the projectile. A short pulse high repetition rate laser in a laser radar system provides a pulsed laser beam which is optically coaligned with the telescope axis. Mirror angular position information, laser radar pulse travel time and the missile spot position on detector array are used by a computer to calculate bullet trajectory information and to determine the source or origin of the projectile using known ballistic trajectory methods.

Although only a small portion of the total trajectory may be captured, the very accurate position information permits extrapolation to determine the launch point of the projectile.

31 Claims, 5 Drawing Sheets

PROJECTILE TRACKING SYSTEM

This invention relates to systems and devices for locating and tracking projectiles and in particular to such systems and devices for locating and tracking small projectiles such as bullets fired by snipers.

BACKGROUND OF THE INVENTION

Present methods of locating snipers include attempts at locating sniper positions from the acoustic muzzle blast of weapon discharge and by optically detecting the sniper or the muzzle flash. Often these methods do not work in many cases because they can be easily defeated by concealment.

Fast infrared cameras are presently available which can take images of a rifle bullet during its trajectory. These devices form two-dimensional images and multiple sensors widely spaced are required to generate a 3-D track.

Laser radar devices have been known for several years and are regularly used for determining the range and speed of moving objects such as motor vehicles.

Applicants' employer owns a patent on a wide field optical system U.S. Pat. No. 4,883,348 issued to Spivey, et al. on Nov. 28, 1989. This system includes a spherical primary mirror and a lightweight secondary optic which can be moved very rapidly in order to scan a field of regard of about 45 degrees to permit the system to track missiles.

A need exists for a better device and method for locating snipers.

SUMMARY OF THE INVENTION

The present invention provides a projectile tracking system for acquiring and precisely tracking a projectile in flight in order to reveal the source from which the projectile was fired. The source is revealed by the back projection of a 3-dimensional track file. The system is particularly suited for tracking a bullet fired by a sniper and identifying the location of the sniper. Projectiles of interest are typically traveling at a substantial fraction of the speed of sound or even faster than the speed of sound, and therefore become hot due to aerodynamic heating. A telescope focuses infrared light from a relatively large field of view on to an infrared focal plane array. In a projectile detection mode, the system searches for the infrared signature of the fast moving projectile. The telescope's field of view is steered in the azimuth by a step and stare mirror which is driven by an azimuth drive motor mounted on a frame. When a projectile is detected the system switches to a tracking mode and the mirror is steered by the azimuth drive motor and a pivot motor to track the projectile.

A short pulse high repetition rate laser in a laser radar system provides a pulsed laser beam which is optically coaligned with the telescope axis. Mirror angular position information, laser radar pulse travel time and the missile spot position on the detector array are used by a computer to calculate bullet trajectory information and to determine the source or origin of the projectile using known ballistic trajectory methods.

Although only a small portion of the total trajectory may be captured, the very accurate position information permits extrapolation to determine the launch point of the projectile.

DETAILED DESCRIPTION OF PREFERRED EMBODIMENTS

First Preferred Embodiment

Figure 1:
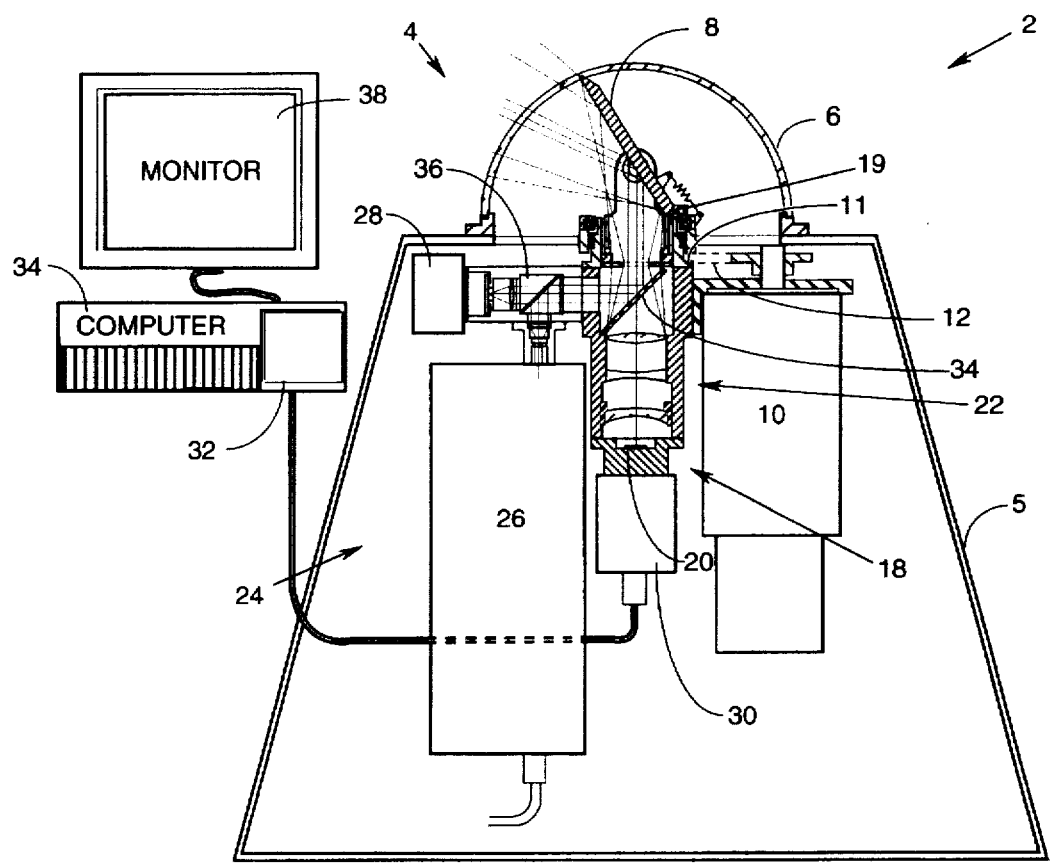
FIG. 1 is a drawing of a preferred embodiment of the present invention.

A cross sectional drawing of a preferred embodiment of the present invention is shown in FIG. 1.

This embodiment provides a system 2 capable of detecting, tracking and ranging on a sniper bullet in flight. Bullet trajectory information is obtained utilizing a very high speed digital infrared camera and a laser ranging system. The bullet trajectory information is then used to calculate a back trajectory to identify the firing origin. The origin information is displayed to identify the location of the sniper.

Figure 2:
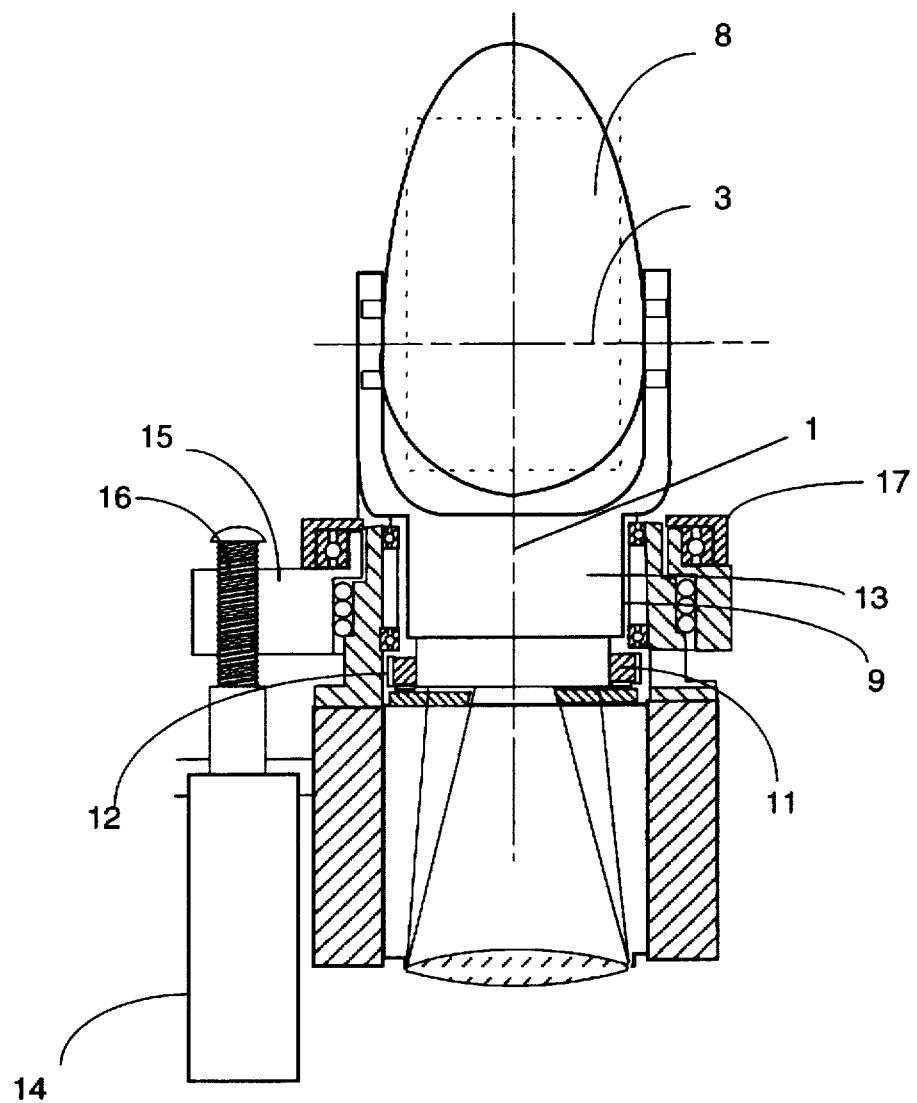
FIG. 2 is a drawing of a view of a position of the embodiment shown in FIG. 1.

The system is contained in case 4 which comprises frame 5 and infrared transparent dome 6. Step and stare mirror 8 is driven azimuthally by azimuth drive motor 10 and tooth belt 12 and mirror 8 is driven in elevation by elevation drive 14 and worm gear 16 as shown in FIG. 2. Light from a particular field of view is reflected from mirror 8 into telescope 18 which focuses the light from the field of view onto an infrared focal plane array 20. Zoom optics 22 in telescope 20 provide a field of view which is adjustable between about 4° and 20°. A laser ranging subsystem 24 includes a pulsed laser 26 and a laser range detector 28.

The system has two basic modes of operation. In Mode 1 the system looks for bullets. If an incoming bullet is detected, the system switches to Mode 2 during which it tracks and ranges the bullet.

Mode 1—Scanning for Bullets

In Mode 1, a detection mode, a coverage area which, for example, could be 180° azimuthal and 38° elevation, is continuously scanned. This is accomplished by the step-wise guided movement of step and stare mirror 8. The Mode 1 field of view of the mirror-telescope system is about 20°× 20°. Thus, we can cover the 180°×38° field in 20 step and stare steps, with a 2° overlap in each step.

At the completion of each step, two frames of infrared data are acquired from the focal plane array and are analyzed to detect the presence of a bullet. These step and stares occur at an approximate 100 Hz rate, which provides for a full area coverage scan rate of approximately 5 Hz. Therefore, all portions of the 180°×38° field of regard are observed each ⅕ second.

Detection of Incoming Bullet

Figure 5A:
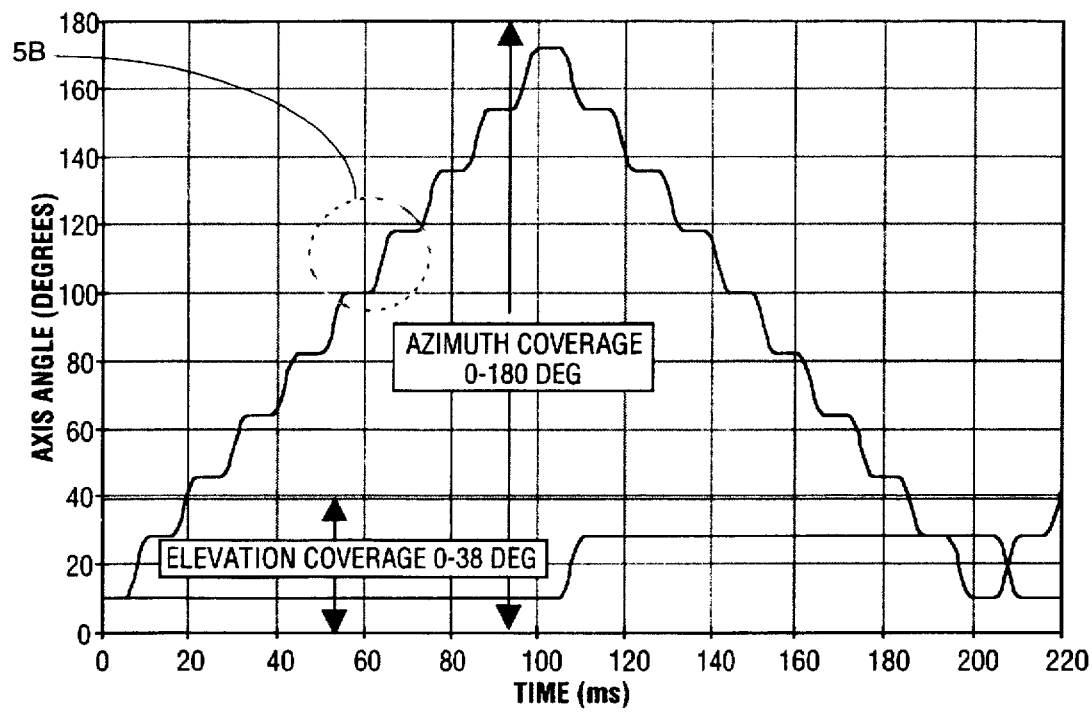
FIG. 5 is a chart demonstrating a preferred step and stare process.
Figure 5B:
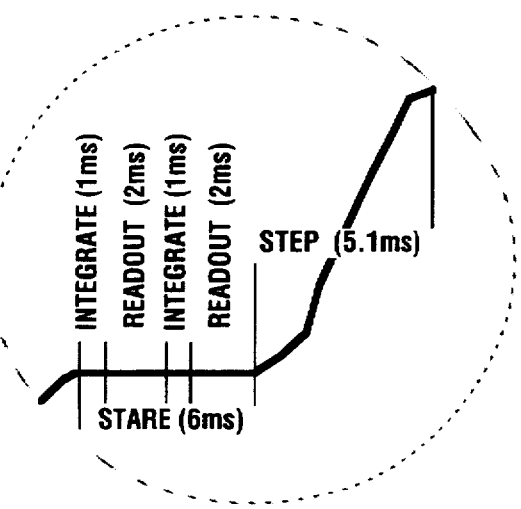

Bullets tracking through the air typically travel at speeds near the speed of sound and they become very hot very quickly, typically in the range of 700°–900° K. Telescope 18 images each 20°×20° object field upon mid wave infrared two dimensional focal plane array 20. Array 20 is a commercially available detector array (Model AE186) manufactured by Amber Engineering with offices in Goleta, Calif. It consists of 512×512, 25 μm pixels which are sensitive to radiation between approximately 3 μm to 5 μm in wavelength. Array 20 has a frame rate of approximately 480 Hz. The analog image data generated by the Array 20 is digitized by pixel array control hardware 30 (Model SVS2000) supplied by Lumitron Corporation with offices in Louisville, Ky. This hardware also performs frame to frame pixel subtraction, in the detection mode (Mode 1), and formats the data for output to TMS320C40 digital signal processor boards 32 manufactured by Ariel Corporation having offices in Highland Park, N.J. FIG. 5 is a graph showing a typical pointing direction as a function of time and the intervals during which the system is in a "stare" configuration. The frame to frame subtraction makes a hot fast moving bullet relatively easy to detect against the essentially stationary background. The C40's calculate the centroid of intensity of the target, if it exists. This centroid data is then passed to a VXIC850 supervisor computer 34 supplied by National Instruments of Austin, Tex. which uses this information in Mode 1 to determine if a target has been detected in each step/stare field of view. At night when background light is small it may be feasible to eliminate frame to frame subtraction which could speed up the scan rate.

In the detection mode the mirror can be rotated continuously in one direction or it could be scanned back and forth over a relatively small field or regard; for example, 30 degrees. In this application (including the claims) the term "rotation" is intended to cover back and forth rotation over small arcs such as 30 degrees.

When the supervisor computer 34 determines that an incoming bullet has been detected, the system is immediately switched from Mode 1, detection to Mode 2, tracking and ranging.

Mode 2—Tracking and Ranging Bullet

In Mode 2 the variable field of view of telescope 18 is zoomed to 4 degrees with zoom optics (22). A digital feedback loop calculated from the bullet image centroid in processor 32 controls the operation of mirror drive motors 10 and 14 in order to place and maintain the bullet image in the center of the telescope 4° field of view. When the image is in the center, the laser radar subsystem 24 will begin ranging on the bullet. The laser used in this system is manufactured by Fibertek Corporation with offices in Herndon, Va. This laser is a pulsed YAG, with a 10 ns pulse width, and up to 250 Hz pulse repetition frequency (PRF). Preferred pulse rates are within the range of 100 Hz to 250 Hz, and preferred pulse widths are between 5 and 20 ns. The YAG output wavelength is 1.06 nm which is shifted to 1.55 nm (an eyesafe wavelength) by passing the beam through an optical parametric oscillator (OPO) also manufactured by Fibertek. A portion of the outgoing pulse is detected by detector 28 also supplied by Fibertek Corporation but substantially all of the pulse is reflected off mirrors 36, 34 and 8 and directed by mirror 8 toward the tracked bullet. A small portion of the laser energy is then reflected from the bullet back to the telescope and is detected by detector 28.

A typical bullet is within the field of regard of the system for about one half second. During tracking, the system collects a set of the following data each 2–10 milliseconds: clock time, laser pulse out time, laser pulse in time, mirror azimuth, mirror elevation, target pixel x position, target pixel y position. (Mirror elevation and azimuth determine the bullet direction only when the bullet image is at the center of the array 20. The target's x and y pixel position permits a correction for any deviation of the image from the center pixel.) This provides up to about 500 sets of bullet positional data per second but typically 250 for each tracked bullet. During the tracking mode, computer 34 calculates the trajectory of the bullet from the position data and calculates from the data coordinates origins of the bullet. These results may be displayed on monitor 38 in almost real time (i.e., within about one second). The longer the bullet is tracked, the higher the accuracy of the origin prediction.

Ultra Low Inertia Step and Stare Mirror System

A key element of this invention is an ultra low inertia step and stare mirror system. The mirror is essentially egg shaped or ellipsoidal, approximately 7 cm×14 cm. It is a compromise between small size, therefore low inertia, and light gathering capabilities. The mirror weighs several grams. This size will collect enough photons, and provide high enough resolution to detect and track a typical bullet at approximately 1 km. Mirror angular position is controlled on both elevation and azimuth to better than 10 µRad accuracy. Angular accelerations of this driven mirror are as high as 40,000 Rad/s$^2$. These accelerations are achievable through the extreme low moving inertia of the mirror, made of beryllium, manufactured by Optical Corporation of America, and through the use of three phase, brushless, high torque to inertia ratio motors. The azimuth motor 10 is a 0.1 HP Electrocraft Brushless Servo motor Model No. E-3629, supplied by Reliance Motion Control with offices in Eden Prairie, Minn. and the elevation motor is a 0.017 HP brushless DC servomotor with a 3:1 gearbox supplied by MicroMo Corporation with offices in St. Petersburg, Fla. The motor is coupled to a 0.25 diameter drive screw with 10 threads per inch. The pointing accuracy is achieved through the use of a high gain feedback control system using high resolution, high bandwidth, optical angular encoders Model M1 manufactured by Cannon Inc. with offices in New York, N.Y.

Mirror 8 may be rotated azimuthally 360° by azimuthal drive motor 10 acting through toothed belt drive 12 on pulley 11 which is firmly attached to frame 9 which in turn is firmly attached to mirror axle support 13, all shown in FIG. 2. Mirror 8 may be pivoted ±10 degrees by vertical drive motor 14 acting through lead screw 16 which raises and lowers lift ring 17 which in turn raises and lowers the lower edge of mirror 8 acting through roller 19 which travels in a radial track in lift ring 17. This causes mirror 8 to pivot up to plus and minus 10° about the horizontal axis of mirror 8. Thus, part 16 rotates about its axis. Part 15 moves vertically; parts 11 and 13 move azimuthally only, part 17 moves azimuthally and vertically and part 19 moves azimuthally, vertically and radially. The step and stare mirror 8 moves azimuthally about axis 1 and pivots ±10 degrees about axis 3.

This seemingly complicated arrangement permits two axis operation of mirror 8 without one of the drives having to deal with the inertia of the other drive unit. Both motor drives are mounted on the stationary portion of system and are independent of the moving axes. Thus, the total weight which has to be rotated azimuthally is reduced to about 0.6 pounds and the total weight which has to be moved vertically is about 0.4 pounds for this preferred embodiment. These weights are based on use of a beryllium mirror. Aluminum and glass mirrors are inexpensive but significantly heavier.

Second Preferred Embodiment

Figure 3:
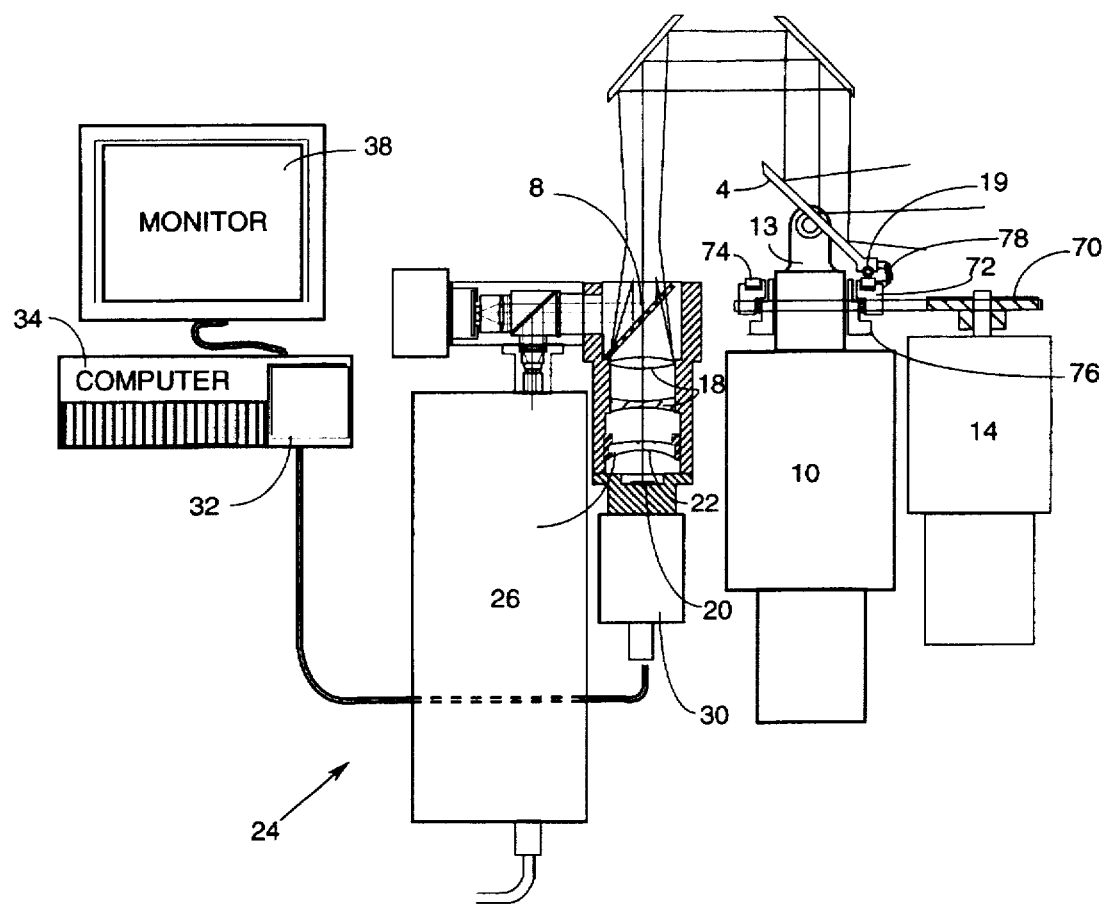
FIG. 3 is a drawing of an alternative embodiment of the present invention.
Figure 4:
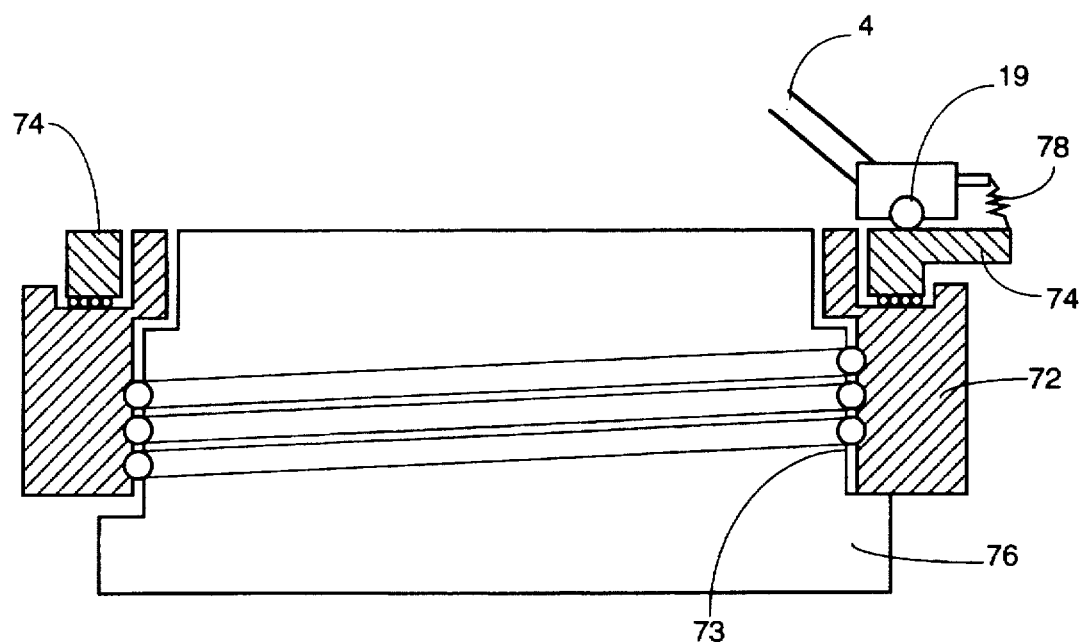
FIG. 4 is a drawing of a portion of the FIG. 3 embodiment.

A sketch of a second preferred embodiment of the present invention is shown in FIG. 3. In this case mirror support 13 is firmly attached to the drive shaft of azimuth motor 10. Vertical pivoting is provided by elevation drive motor 14 acting through pully 70 on lift ring 72 which supports rotating track ring 74. A threaded roller bearing 73 acting between lift ring 72 and stationary support ring 76 causes lift ring 72 to rise and lower when the shaft of elevation drive 14 is rotated by drive belt 70. Roller bearings along the bottom of rotating track ring 74 permit rotating track ring 74 to rotate with mirror support 13, thus, support 13 rotates in azimuth; stationary support ring 76 is stationary; left ring 72 rotates in azimuth as driven by elevation driver 14 and moves in elevation; rotating track ring 74 moves in elevation with lift ring 72 but rotates in azimuth as driven by azimuth drive motor 10 as it is dragged around by roller 19 which runs in a radial track in rotating track ring 74. Spring 78 holds roller 19 in the radial track on rotating track ring 74. A blowup showing these features is shown in FIG. 4.

While the above descriptions contain many specifics, the reader should not construe these as limitations on the scope of this invention, but merely as exemplifications of preferred embodiments thereof. Those skilled in the art will envision many other possible variations which are within its scope.

Under normal circumstances, origin of the projectile can be determined by following the ballistic back projection until it intersects a stationary object, e.g., the window of a building. However, the origin may not always be from a stationary object, but may originate from an ambiguous set of locations, e.g., one of several trees or hills along the ballistic path. Correlation between device measured ballistic trajectory and known ballistic coefficients can be used to eliminate or reduce these ambiguities. Ballistic coefficients/conditions for the majority of standard rifle/cartridge combinations have been characterized for some time by cartridge manufacturers, and by the military. Initial (muzzle) conditions are part of the known cartridge/rifle characterizations. Using the correlation between the bullet under track and the known coefficients, type of cartridge/rifle used can be identified. Then, using the known initial conditions for the identified cartridge/rifle and the ballistic back projection calculated for the bullet under track, the origin of the bullet can be calculated to a high degree of accuracy.

In the described preferred embodiments during Mode 1 (step and stare detection) two frames of data are acquired and differenced, during each stare. This function is to maximize signal to clutter ratio, and to be used as a moving target indicator (MTI). In scenarios where the background clutter temperatures are low, only one frame per stare is necessary. This effectively decreases the time between steps, and improves the area coverage rates.

The laser radar described uses a pulsed solid state laser, and a direct detection method from which radial range data is derived. Alternatively, a heterodyne detection system could be incorporated which will allow derivation of both radial range and radial velocity data. Also a pulsed gas laser, e.g., $CO_2$ may be used.

Coverage area described as 180° by 38° or 360°×20° is arbitrary, and can be expanded to 360°×>90°, at the cost of step/stare coverage rate.

Information of calculated projectile origin can be presented to user through many means, several of which are described below:

Computer display with angle/angle range from device, and/or with point or "x" on computer generated situation map, and/or with GPS world coordinates.

Beam of light from a spotlight or laser (e.g. HeNe) can be slewed by the device to point out the origin of projectile.

Device could transmit GPS correlated origin data via RF or light communications to personnel, who using GPS can identify the origin location. Alternatively, the personnel can use a GPS equipped pointing system which will receive the GPS correlated data from device, and point the user to the origin position using electronic crosshairs and/or other direction indicators.

In the case where device is used to detect and track incoming weapons, e.g., a mortar or artillery round, the device can be used to control an autonomous response, e.g., launch and steer an intercept vehicle, or steer and fire a high power laser beam, in order to destroy the weapon prior to impact with its target.

Detector arrays sensitive at wavelengths other than 3 to 5 μm may be used, e.g., 8 to 11 μm infrared, and/or visible. In addition, multiple arrays, with different sensitive wavelengths may be imaged coaxially through the optical system, and the data from said arrays can be fused to improve data validity.

Accordingly, the reader is requested to determine the scope of the invention by the appended claims and their legal equivalents and not by the examples which have been given.

What is claimed is:

1. A system for tracking projectiles, comprising:
   (a) a steerable optical system including:
      (1) an infrared detector for detecting existence of an infrared emitting projectile;
      (2) a laser range finder for providing range data about a detected projectile;
   (b) a steering control system, coupled to the steerable optical system, for:
      (1) steering the optical system in a detection mode until detection by the infrared detector of a projectile;
      (2) steering the optical system in a tracking mode to generate range and position data about the detected projectile;
   (c) an analysis system, coupled to the steerable optical system and the steering control system, for determining the trajectory of the detected projectile based upon the range and position data generated by the steering control system.

2. A system as in claim 1 wherein the steering control system further generates optical system position information, and the analysis system further determines the trajectory of the detected projectile based upon the generated optical system position information, and data defining the position of the system for tracking projectiles.

3. A system as in claim 1 wherein the steerable optical system includes a telescopic zoom lens system for altering the field of view of the steerable optical system from a wide angle during the detection mode to a narrow angle during the tracking mode.

4. A system as in claim 1, wherein the steerable optical system is controlled by the steering control system to step and stare with the infrared detector during the detection mode.

5. A system as in claim 1, wherein the steerable optical system is controlled by the steering control system to move essentially continuously during the tracking mode.

6. A system as in claim 1, wherein the steerable optical system includes a mirror steerable azimuthally.

7. A system as in claim 1, wherein the steerable optical system includes a mirror steerable elevationally.

8. A system as in claim 1, wherein the laser range finder includes a short pulse, high repetition rate laser.

9. A system as in claim 1, wherein the laser range finder includes a detector for detecting laser energy reflected from the detected projectile.

10. A system as in claim 1, wherein said steerable optical system comprises a low mass mirror.

11. A system as in claim 10 wherein said low mass mirror is comprised of beryllium.

12. A system as in claim 10 wherein said laser range finder comprises a short pulse high repetition laser for illuminating said projectile.

13. A system as in claim 1 and further comprising a global position system wherein said analysis system comprises a computer programmed with an algorithm for calculating origins of said projectile.

14. A system as in claim 1 wherein said analysis system comprises process control and a computer programmed with an algorithm for launching or steering a responsive weapon system toward said projectile.

15. A system as in claim 1, wherein said analysis system comprises process control and a computer programmed with an algorithm for launching or steering a responsive weapon system toward a calculated origin of said projectile.

16. A system as in claim 1 wherein said analysis system comprises an algorithm performing frame substraction.

17. A system as in claim 1 wherein said analysis system comprises an algorithm for determining a trajectory of said projectile using ballistic coefficients.

18. A projectile tracking system for tracking projectiles, comprising:

A. a frame;

B. an infrared detector array mounted on said frame, said detector array comprising an array of infrared detecting pixels;

C. a telescope mounted on said frame and defining a telescopic axis said telescope comprising optics for focusing at least one field of view onto said detection array.

D. a step and stare mirror pivotably mounted (1) to rotate about said telescopic axis and (2) to pivot about a second axis intersecting said telescopic axis;

E. an azimuthal drive motor on said frame for rotating said first mirror about said telescopic axis;

F. a pivot motor mounted on said frame for pivoting said first mirror about said second axis;

G. a motor control system for controlling (1) at least said azimuthal drive motor in a detection mode and (2) said azimuthal drive motor and said pivot motor in a tracking mode, said detection mode comprising movement of said step and stare mirror in small steps separated by time intervals when said mirror is stationary with respect to said frame, and said tracking mode comprising substantially continuous movement of said mirror in order to track projectiles;

H. a processor programmed to (1) analyze infrared optical data produced by said infrared detector array in order to detect from said data the presence of a projectile and 2) initiate said tracking mode upon detection of a projectile;

I. a laser radar system comprising 1) a short pulse laser for producing a high repetition rate short pulse laser beam, 2) beam turning optical elements for coaligning said laser beam and said telescopic axis and 3) a reflected beam detector aligned to detect portions of said laser beam reflected from projectiles;

J. a position detection system for detecting the position of the step and stare mirror and providing mirror position data;

K. a computer programmed with an algorithm for calculating the origin of said projectile based on data from said position detection system, said reflected beam detector, and said detector array.

19. A projectile tracking system as in claim 18 wherein said second axis is perpendicular to said telescopic axis.

20. A projectile tracking system as in claim 18 and further comprising a lift ring and a lead screw for converting rotary motion generated by said pivot motor into pivot motion of said step and stare mirror.

21. A projectile tracking system as in claim 18 wherein said high repetition rate is about 100 to 250 pulses per second.

22. A projectile tracking system as in claim 21, wherein said pulses are about 5 to 20 ns in duration.

23. A process for tracking projectiles, comprising:

(a) providing a steerable optical system including an infrared detector and a laser range finder;

(b) providing a steering control system, coupled to the steerable optical system;

(c) providing an analysis system, coupled to the steerable optical system and the steering control system;

(d) steering the optical system in a detection mode;

(e) in said detection mode, detecting an infrared emitting projectile using the infrared detector;

(f) responsive to detection of said infrared emitting projectile by the infrared detector, steering the optical system in a tracking mode;

(g) in said tracking mode, obtaining range and position data about said infrared emitting projectile;

(h) determining with said analysis system a trajectory of said infrared emitting projectile based upon the range and position data.

24. The process of claim 23 wherein step (e) comprises:

acquiring a first frame of data with the optical system in a first position;

acquiring a second frame of data with the optical system still in the first position;

performing frame subtraction with said first frame of data and said second frame of data.

25. The process of claim 23 further comprising: zooming the optical system from a larger field of view to a smaller field of view between step (e) and step (g).

26. The process of claim 23 further comprising calculating an origin of said infrared emitting projectile.

27. The process of claim 23, wherein the steerable optical system is controlled by the steering control system to step and stare with the infrared detector in the detection mode.

28. The process of claim 23, wherein the steerable optical system is controlled by the steering control system to move essentially continuously in the tracking mode.

29. The process of claim 23, further comprising steering, with said analysis system, a responsive weapon system toward a calculated origin of said infrared emitting projectile.

30. A system for tracking projectiles, comprising:

an infrared detector array;

optics configured for selectively focusing one of a first field of view and a second field of view onto said detector array;

a laser system comprising:
    a laser for producing a laser beam in substantially fixed alignment with said first field of view and said second field of view; and
    a laser detector aligned to detect portions of said laser beam reflected from projectiles;

a position detection system for detecting the position of the first field of view and the second field of view;

a control system configured to:
  operate in a detection mode wherein the optics focus the first field of view onto said detection array, said detection mode comprising: movement of said first field of view in discrete steps separated by time intervals when said first field of view is stationary; and in each of the time intervals collect infrared optical data produced by said infrared detector array;
  analyze said infrared optical data produced by said infrared detector array in order to detect from said infrared optical data the presence of a projectile;
  upon detection of the presence of a projectile, initiate operation in a tracking mode wherein the optics focus the second field of view onto said detection array, said tracking mode comprising: substantially continuous movement of said second field of view so as to track said projectile, while said laser detector detects portions of said laser beam reflected from said projectile; and
  calculate a trajectory of said projectile based on data from said position detection system, said laser detector, and said detector array in said tracking mode.

31. The system of claim 30, wherein the optics comprise a mirror and wherein in the tracking mode the control system is configured to calculate the trajectory based upon sets of data taken at a series of intervals, each set of data including:
  a laser pulse out time from the laser detector;
  a laser pulse in time from the laser detector;
  azimuth data for the mirror from the position detection system;
  elevation data for the mirror from the position detection system;
  x and y pixel position data from said detector array.

* * * * *